United States Patent Office 2,761,098
Patented Aug. 28, 1956

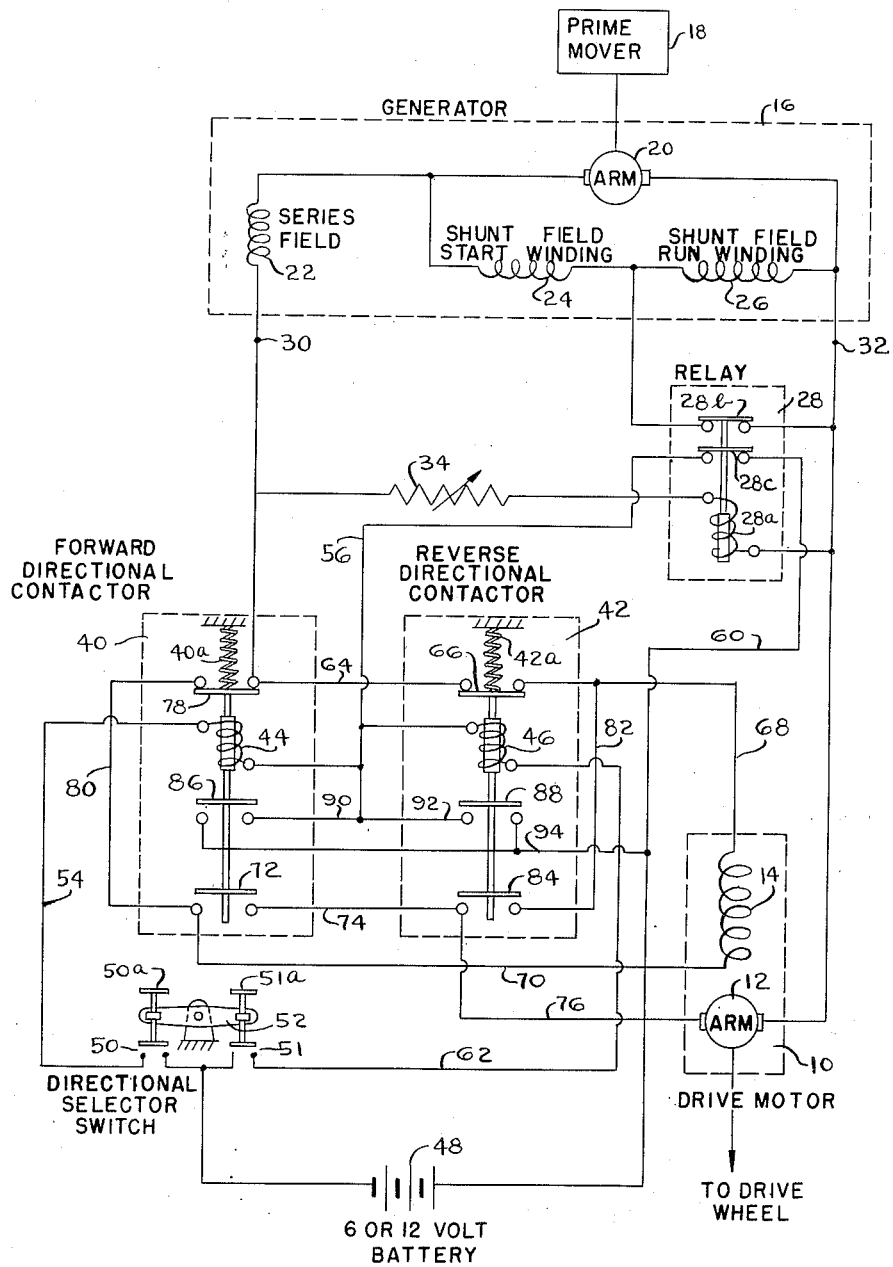

2,761,098

POWER TRANSMISSION SYSTEM

Edward R. Sirotak, Cleveland, Ohio, assignor, by mesne assignments, to The Baker-Raulang Company, a corporation of Delaware Application August 10, 1953, Serial No. 373,170

5 Claims. (Cl. 318—151)

This invention relates to an electric system for the transmission of power from a variable speed prime mover to a variable speed load. My invention is especially useful for the driving of loads of considerable inertia.

While the invention is especially useful in the driving of vehicles powered by internal combustion engines, it is not limited to such use and may be applied to other uses, such as hoisting devices or similar machines.

For the purpose of illustration, my invention will be described as applied to vehicles for the handling of materials, such as fork trucks of known construction.

In such vehicles, a most desirable feature is maneuverability coupled with smooth acceleration from a stopped position to operating speed.

Another important feature is what is termed a good "inching" characteristic. By this is meant the ability to drive the vehicle small but precise distances at very low speeds.

Another desirable feature is the elimination of a clutch and gear shift mechanism such as are found on conventional vehicles. If these devices can be eliminated, the operator's hands are free for steering and operating the other mechanisms associated with the vehicle.

It is the object of the present invention to provide all of these features in a vehicle and thereby to provide a truck or the like, the operating characteristics of which are improved considerably over the known trucks.

My improved transmission system involves the use of a self-excited generator directly connected to the prime mover and generating a voltage dependent upon the speed of the prime mover, the generator being electrically connected to a driving motor for the load, the direction of operation of the load being controlled by directional contactors selectively operated to effect direct connection of the generator to the motor.

Another object of the invention is to provide a voltage responsive safety control to prevent operation of either directional contactor when the generator voltage is above a predetermined value, thus preventing connection of the motor to the generator when the prime mover is operating at high speed.

These and other objects will become more readily apparent from the following detailed description of the invention taken in conjunction with the accompanying drawing which shows a circuit diagram of a transmission system according to the present invention.

The vehicle with which the invention is used is a fork truck of known design in which a hydraulic or mechanical lift fork is mounted on a four-wheel vehicle. The mechanism for driving the fork is conventional and forms no part of the present invention. The present invention is directed to the power transmission system for operating the drive wheels of the truck from the engine or prime mover.

Referring specifically to the drawing, a drive motor 10 having an armature 12 and a field winding 14 has its shaft positively connected through suitable gearing to the drive wheels of the vehicle, not shown. The power for the drive motor is derived from a generator 16 which is driven by a prime mover 18, preferably an internal combustion engine. The generator has an armature 20, a series field 22, and two shunt field windings 24 and 26 connected in series across the armature 20. The field winding 24 is the "start" winding and is formed of heavy low resistance wire in order to provide sufficient ampere turns at low prime mover speeds, thus facilitating quick and smooth generator voltage build-up.

The other shunt field winding 26 is of a conventional type and is formed of a larger number of turns of smaller wire to provide the necessary field flux at lower current when the prime mover is operating at higher speeds. The run field winding 26 is inoperative only at comparatively low prime mover speeds, for example, up to 1000 R. P. M. and is controlled by a relay 28 having its winding 28a connected across the output terminals 30 and 32 of the generator. Normally, run winding 26 is shorted out of the shunt field circuit by normally closed contact 28b of relay 28. When relay 28 is operated, contact 28b opens the short-circuit and renders winding 26 effective. Connected in series with the relay winding is a variable resistance 34 which can be adjusted to determine the generator voltage at which relay 28 will be actuated to add the run field winding 26 to the generator circuit.

The generator is electrically connected to the drive motor for either forward or reverse direction by directional contactors 40 and 42 of the electromagnetically operated type. These contactors are operated by coils 44 and 46 which are energized by a separate power source 48. This separate power source can conveniently be the six-volt starting battery of the prime mover. The directional contactors are selectively controlled by forward and reverse switches 50 and 51, which may be hand-controlled but preferably are mounted on the floor board of the vehicle. For example, the directional switches 50 and 51 may be operated by pedals 50a and 51a mounted on the floor board in a position to be operated by the left foot. The two switches may be interlocked by a pivoted lever 52 to prevent operation of both switches at the same time, but this is not essential.

As shown in the drawing, with the system in its non-driving condition directional contacts 40 and 42 are held in released position by suitable biasing means represented by springs 40a and 42a. To operate the forward directional contactor 40, switch 50 is closed to energize coil 44 through a circuit extending from the left side of the power source 48 through switch 50, line 54, coil 44, line 56, contact 28c of relay 28, and line 60 back to the power source 48.

Conversely, to operate the reverse directional contactor 42, switch 51 is closed to energize coil 46 through a circuit extending from power supply 48, through reverse switch 52, line 62, coil 46, line 56, contact 28c of relay 28 and line 60, back to the other side of the power supply 48.

It will be observed that, to operate either directional contactor, the contact 28c of relay 28 must be closed. As set forth above, relay 28 is inoperative and thus contact 28c is closed only when the voltage of the generator is below the value necessary to actuate or to release the relay 28. However, if the prime mover is driving the generator at such a speed that there is sufficient generator voltage to actuate relay 28, it will be impossible to operate either directional contactor and, therefore, impossible to connect drive motor 10 to the generator 16.

When the desired directional switch is closed, assuming contact 28c is closed, drive motor 10 is connected to output terminals 30 and 32 of the generator 16 by the following circuits: The circuit for forward drive includes terminal 30, line 64, reverse contact 66, line 68, series field 14, line 70, forward contact 72, lines 74, and 76, motor armatures 12, and terminal 32.

The reverse drive circuit extends from terminal 30 through forward contact 78 and then through lines 80 and 70, series field 14, lines 68 and 82, reverse contactor 84, line 76, and drive motor armature 12 to terminal 32.

As stated above, when the output voltage of generator 16 reaches a predetermined value, relay 28 is actuated. Ordinarily, the operation of relay 28 would open contact 28c, thus de-energizing the coil 44 or 46 of the directional contactors, thereby disconnecting the motor from the generator. To avoid such an occurrence, there is provided, in each directional contactor, holding contacts 86 and 88 respectively. These contacts are arranged to complete bridging circuits around contact 28c at the time that either directional contactor is energized, thereby maintaining the coil 44 or 46 associated with that contactor in energized condition. Thus, the control circuit by-passes relay 28 by going from either coil 44 or 46 to line 90 or 92, holding contact 86 or 88, to line 94 and thence to the power supply.

Operation

In describing the operation of the invention, hypothetical values of current, voltage, and prime mover speed will be used for relative comparison.

The prime mover is started and run at an idling speed of say 500 R. P. M. At this speed, the generator open-circuit voltage is approximately 8 volts which is insufficient to operate relay 28 and, therefore, contacts 28b and 28c remain closed.

It is, therefore, possible to energize the operating coil of either directional contactor to operate the drive motor in either direction, for example, by pushing the forward foot pedal 50a, the "forward" contactor 40 will be operated and will be held in operated position by holding contact 86.

The drive motor is now connected directly across the generator 16 which is now at 8 volts. This voltage provides sufficient power to take up the back-lash of the gears, etc. between the motor and the drive wheels.

The prime mover accelerator is now operated to increase the engine speed and thereby to increase the generator voltage. With only the low resistance shunt winding 24 in the field circuit, an exciting current of the magnitude of 30 amperes flows through start winding 24 to assist the residual field for a quick voltage build-up. As a practical matter, it would be too expensive to use a single low resistance field winding necessary for low power "inching" control which would also be suitable for the higher speeds of the prime mover. For this reason, provision is made for inserting the additional field winding 26 in the shunt field circuit when the engine speed increases and the generator voltage rises above a certain value.

At about 1000 R. P. M. when the generator voltage reaches 15 volts (or any other voltage for which relay 28 is designed), relay 28 is sufficiently energized to be actuated, thus opening contact 28b to add run winding 26 in series with start winding 24. The increased resistance of the field circuit due to the inclusion of run winding 26 limits the field current to a safe value, even should the prime mover be speeded up to the point where the generator voltage is in the neighborhood of 80 volts.

Thus, by providing a low resistance shunt winding for low prime mover speeds and a higher resistance field winding for higher speeds, a smooth, quick build-up of voltage is impressed on the drive motor, resulting in smooth operation of the vehicle from extremely low speeds to very high speeds. Additionally, the control characteristics at low speeds are improved through the use of the low resistance start winding alone.

Should the prime mover speed be higher than the speed at which the relay 28 operates, the directional contactors cannot be operated because contact 28c of relay 28 is open and, therefore, the drive motor cannot be connected to the generator output. This is a protection provided to prevent jerky starts which would result in case one of the directional contactors were operated to connect the motor to the generator at a time when the generator voltage is high.

The "drop-out" or de-energization of relay 28 can be set at a suitable voltage, for example, 12 volts, and the directional contactor can close only after the speed of the prime mover and thus the voltage of the generator is reduced to or below the "drop-out" value. This is advantageous particularly where the prime mover speed is increased for other functions which the driver must perform, such as the operation of the lift fork or the like which occurs when the prime mover is used to power a hydraulic pump which drives the lift mechanism.

It will also be observed that the operator cannot switch from forward to reverse when the prime mover is operating at high speed, or at a speed sufficiently high to maintain relay 28 in operated position. To make a shift from forward to reverse, for example, pedal 51a is depressed to close reverse switch 51, but before this switch closes forward switch 50 is opened by bar 52 to de-energize coil 44 to release forward contactor 40 and thereby open holding contact 86. Thus, when switch 51 closes, the circuit for coil 46 is open at contact 28c and this coil can be energized only when the prime mover speed is reduced sufficiently to release relay 28.

From the foregoing it will be seen that by mounting directional control pedals 50a and 51a on the floor board in a position convenient for operation by the left foot, the right foot is free for controlling the accelerator pedal in the usual manner, and the operator's hands are free for steering the vehicle or for other control purposes, such as operating the fork lift. It will also be noted that my power transmission system is greatly simplified over conventional arrangements. For example, there is no hand-operated controller for controlling the direction and speed of operation. Also, the conventional clutch and gear-shift are absent, thereby eliminating jerky starts and "step ladder" acceleration, and my system does not involve the use of speed control resistors in the power circuit connecting the generator to the motor. My power transmission system provides a smooth, unbroken acceleration controlled only by controlling the speed of the engine or prime mover.

In a general manner, while there has been disclosed what is deemed to be a practical and efficient embodiment of the invention, it should be well understood that the invention is not limited to the above description as there might be changes made in the arrangement, disposition, and form of the parts without departing from the principle of the present invention as comprehended within the scope of the accompanying claims.

I claim:

1. An electric power transmission system comprising, a variable-speed prime mover, a generator connected to be driven by said prime mover, said generator having a start shunt field winding of low resistance to provide large ampere turns at low prime mover speeds and a normally inoperative run shunt field winding of a greater number of turns and higher resistance than said start winding, a drive motor, directional contactor means for selectively connecting and disconnecting said motor to said generator for forward and reverse drive, and voltage responsive relay means energized by said generator for inserting said run shunt winding in the circuit of said generator and for preventing operation of said directional contactor means to connect said motor to said generator when the voltage of said generator exceeds a predetermined value.

2. An electric power transmission system comprising, a prime mover, a generator drivably connected to said prime mover, said generator having a low resistance field winding and a high resistance field winding, a drive motor, directional contactor means for selectively connecting said motor to said generator for forward and reverse drive, a voltage-responsive relay energized by said generator, a contact on said relay for short-circuiting said high resistance field winding when said relay is in released position, and means controlled by said relay in released position for preventing operation of said directional contactor means.

3. A power transmission system according to claim 2 wherein said directional contactor means comprises an electromagnetically-operated switch having an energizing circuit completed through a contact on said voltage-responsive relay when said relay is in released position.

4. A power transmission system according to claim 3 and including contacts controlled by said directional contactor in operated position for completing said energizing circuit independently of said relay.

5. A power transmission system according to claim 2 in which said directional contactor means comprises a forward relay and a reverse relay, each relay having contacts which, when one relay is energized and the other is released, (a) connect said drive motor to said generator for operation in one direction, (b) close a holding circuit to maintain said one relay energized at high prime mover speeds, and (c) open the circuit between said generator and motor for operation in the opposite direction.

References Cited in the file of this patent

UNITED STATES PATENTS

| | | |
|---|---|---|
| 1,180,776 | Laycock | Apr. 25, 1916 |
| 2,259,306 | Harding | Oct. 4, 1941 |
| 2,278,632 | Baer et al. | Apr. 7, 1942 |
| 2,459,665 | King et al. | Jan. 18, 1949 |